United States Patent [19]
Eckley

[11] Patent Number: 5,452,679
[45] Date of Patent: Sep. 26, 1995

[54] HOISTING DEVICE WITH STRESSING INDICIA

[75] Inventor: Gary W. Eckley, Hiawatha, Iowa

[73] Assignee: Columbus McKinnon Corporation, Cedar Rapids, Iowa

[21] Appl. No.: 188,389

[22] Filed: Jan. 26, 1994

[51] Int. Cl.$^6$ .............................. G01D 11/00; G01L 5/00; G01B 5/30; F16B 31/02

[52] U.S. Cl. .................... 116/200; 116/212; 116/208; 116/DIG. 34; 73/760; 73/862.621; 411/8; 411/400

[58] Field of Search .................... 116/208, 200, 116/212, DIG. 63, DIG. 34; 294/82.1; 73/760, 761, 762, 862.621, 862.636, 862.637; 411/8, 14, 400, 401, 9

[56] References Cited

U.S. PATENT DOCUMENTS

| | | | |
|---|---|---|---|
| 2,966,878 | 1/1961 | Feiser, Jr. | 116/212 |
| 3,077,178 | 2/1963 | Gordon | 116/212 |
| 3,613,679 | 10/1971 | Bijou | 73/760 |
| 3,853,546 | 12/1974 | Wrener et al. | 116/212 |
| 5,103,755 | 4/1992 | Garrett. | |

*Primary Examiner*—William A. Cuchlinski, Jr.
*Assistant Examiner*—Andrew Hirshfeld
*Attorney, Agent, or Firm*—Simmons, Perrine, Albright & Ellwood

[57] ABSTRACT

An improved hoisting device, such as a hook, shackle, ring, link, or the like, includes indicia for determining deformation damage to the device from overstressing. The indicia includes components which assume a predetermined geometrical configuration, such as a line segment co-linearly aligned with another line segment or dot, as the device is in an unstressed and undeformed state, and which do not assume the predetermined configuration if the device have been damaged from over-stressing. The indicia also includes cooperating components for dynamically indicating the magnitude of stressing relative to the maximum design stress of the device. The indicia is adapted for both close proximity and remote stressing determinations.

22 Claims, 2 Drawing Sheets

HOISTING DEVICE WITH STRESSING INDICIA

BACKGROUND OF THE INVENTION

1. Field of the Invention

The present invention relates generally to devices used for hoisting and binding heavy loads and, particularly, to such devices having indicia for determining certain stressing thereof.

2. Description of the Related Art

Devices for hoisting heavy loads, such as with a crane, are well known. A variety of different designs have been developed to meet the requirements of particular applications. For example, such devices include hooks, shackles, links, rings, and the like.

Each of these devices are generally designed to have certain maximum load or stress limits. Sometimes, these devices are subjected to loads and stresses which exceed those maximum limits. Although such excessive stresses may not cause the overloaded device to fracture, it may cause the device to deform. Due to such deformation, the maximum load which the device can subsequently withstand without fracture may have been drastically reduced. Thus, it is extremely important that such deformation be detected before serious damages or injuries result therefrom.

Unfortunately, such deformation may only be signalled by relatively minor variations in the outward appearance of an overstressed device. As a result, the fact that a device has been damaged may not be readily apparent visually. An attempt to solve this problem was provided in U.S. Pat. No. 5,103,755, issued Apr. 14, 1992 to C. R. Garrett. That patent teaches spacing a pair of markers at a known, fixed distance apart across the throat of a hook. A subsequent deviation from that spacing indicates that the hook has been overstressed and should be replaced. Unfortunately, a user who failed to have a measuring device available at the time the spacing was checked would be provided no greater protection by one of the devices taught by the '755 patent than he would have been provided by a device without the pair of markers.

In addition, some uses of a hoisting device may, for one reason or another, not allow a user to approach the device to inspect it for deformation from overstressing. For example, the device may be used for handling hazardous material or be positioned such that one cannot physically measure the spacing with a scale, etc. Further, it may be desirable in some applications to be able to determine whether a particular load being handled by a hoisting device is within the maximum load designed for that device.

Thus, what is needed is a device which can be inspected for overloading without a measuring instrument, which can be remotely inspected for deformation, and which can be remotely inspected to determine whether a particular load being handled by the device is within design load limits.

SUMMARY OF THE INVENTION

An improved device is provided for use with hoisting and binding heavy loads. The device of the present invention may be in the form of a hook, a shackle, a ring, a link, or variations thereof.

The device includes indicia affixed to a body thereof. The indicia includes a pair of components, at least one of which is a line segment, which are co-linearly aligned as the device is in an unstressed and undeformed state. If the device becomes damaged from overstressing, the components will not return to the colinearly-aligned configuration between usages. Such alignment or non-alignment, as the case may be, can be readily checked with a straightedge without requiring a measuring device.

For some devices, such as a ring or a link, the indicia may include a plurality of corresponding pairs of components which colinearly align as the device is in an unstressed and undeformed state, and some of which pairs will not re-align between usages if the device has become damaged from overstressing.

The indicia may also include one or more other paired arrangements wherein components of the indicia are colinearly aligned as the device is in an undeformed state and is subjected to substantially maximum design stress.

For applications wherein the device is remotely spaced from a user, the indicia of the device are adapted to be observed with a transit or other telescopic device having crosshairs. By comparing the indicia of the device with the crosshairs, the stressing of the device relative to its maximum design stress, or the existence of damage from overstressing, can be remotely determined.

PRINCIPLE OBJECTS AND ADVANTAGES OF THE INVENTION

The principal objects and advantages of the present invention are: to provide a device which can be checked for deformation by visually sighting along indicia of the device; to provide such a device which can be checked for deformation by using a straight edge, such as the side of a pencil or cigarette; to provide such a device which can be checked for deformation by comparison with a cross-hair of a transit or other telescopic instrument; to provide such a device which can be remotely checked for deformation; to provide such a device which can be remotely checked to determine whether a load being handled by the device is within design load limits; and to provide such a device which is economical to manufacture, is reliable in operation, and is particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figure 1:
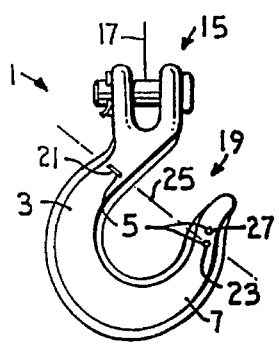
FIG. 1 is a side elevational view of a hoisting hook with stressing indicia, shown in an unstressed and undeformed state, according to the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally refers to a hoisting device with stressing indicia in accordance with the present invention, as shown in FIGS. 1 through 11. The device 1 generally includes a body 3 and indicia 5.

Figure 5:
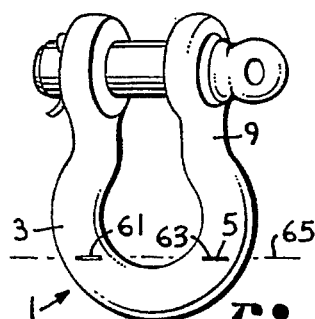
FIG. 5 is a perspective view of a shackle with stressing indicia, shown in an undeformed and unstressed state, according to the present invention.
Figure 6:
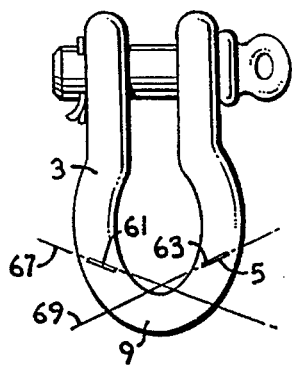
FIG. 6 is a side elevational view of the shackle, shown in a lengthwise deformed state.
Figure 7:
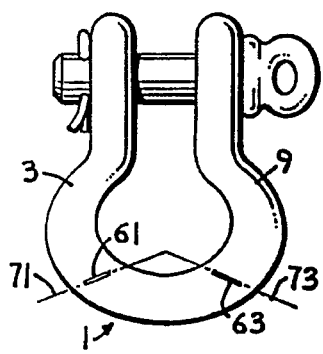
FIG. 7 is a side elevational view of the shackle, shown in a crosswise deformed state.
Figure 8:
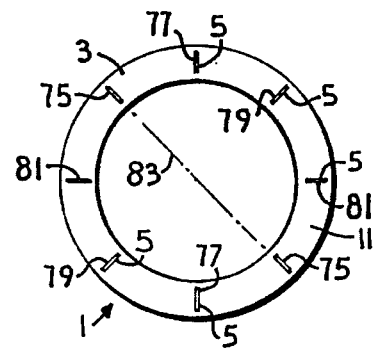
FIG. 8 is a side elevational view of a hoisting ring with stressing indicia, shown in an undeformed and unstressed state, according to the present invention.
Figure 9:
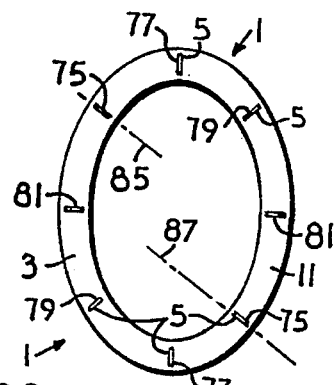
FIG. 9 is a side elevation view of the hoisting ring, similar to that depicted in FIG. 8, but showing the ring in a deformed state.
Figure 10:
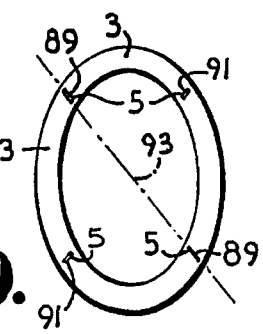
FIG. 10 is a side elevational view of a hoisting link with stressing indicia, shown in an undeformed and unstressed state, according to the present invention.
Figure 11:
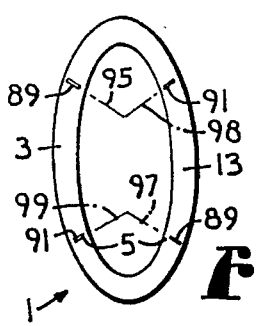
FIG. 11 is a side elevation view of the hoisting link, similar to that depicted in FIG. 10, but showing the link in a deformed state.

The body 3 may be in the form of a hook 7, as shown in FIG. 1, a shackle 9, as shown in FIG. 5, a ring 11, as shown in FIG. 8, a link 13, as shown in FIG. 10, or a variety of other similar devices and variations thereof.

The hook 7 includes connecting means 15, such as a clevis arrangement, an eye or the like, for connecting the body 3 to a connecting member 17 (shown schematically in FIG. 1), such as a hoisting or tie-down line, strap, chain, cable or the like. The hook 7 has a throat, as designated by the numeral 19 in FIG. 1.

The indicia 5, which is affixed to the body 3, may protrude from the body 3, be engraved in the body 3, or involve any other arrangement which makes the indicia 5 readily visible. The indicia 5 may have any predetermined geometrical configuration desired for the purposes herein described.

Figure 2:
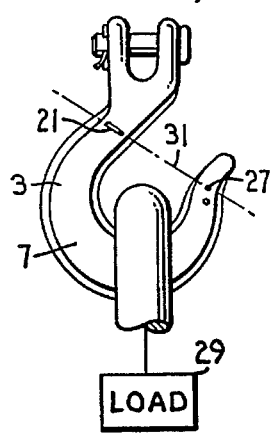
FIG. 2 is a side elevational view of the hoisting hook, shown in an undeformed state but stressed by a maximum design load (shown schematically).

One application of the indicia 5 is shown in FIGS. 1 and 2. In that example, the indicia 5 includes a straight line segment 21 and a circularly shaped mark with minimal dimensions having the appearance of a dot 23. The line segment 21 and the dot 23 are spaced on opposite sides of the throat 19 such that the line segment 21 and the dot 23 are co-linearly aligned as the hook 7 is in an unstressed and undeformed state, as indicated by the extended line designated by the numeral 25 in FIG. 1. If the hook 7 does not become deformed during use, the dot 23 should return to co-linear alignment with the line segment 21 between usages of the hook 7. The state where the hook 7 is flexed from its original unstressed position but is not deformed from overstressing is considered a deflected state. Stress in excess of the hook's maximum design stress will cause the hook to deform.

To determine whether the indicia 5 indicates whether the hook 7 has been deformed from overstressing, a user can simply sight visually along the line segment 21 to determine whether the dot 23 is co-linear therewith. Alternatively, the user may position any available straightedge (not shown), alongside the line segment 21 to determine whether the dot 23 also lies alongside the straightedge. If it does, the hook 7 has not been overstressed and is available for continued use; if it does not, the hook 7 has been deformed and damaged and, therefore, should probably not be used. Note that the straightedge used for this purpose does not require scaled, measuring demarcations, as the determination of deformation depends only on the geometrical configuration of the straightedge; the side of a cigarette or pencil may suffice.

If desired, the indicia 5 may also include another dot 27. As the hook 7 is subjected to a load 29 (shown schematically in FIG. 2), the hook 7 will tend to flex such that the dot 23 is no longer co-linearly aligned with the line segment 21. Generally, the hook 7 has a maximum design load which can be sustained without permanent deformation. The dot 27 is spaced such that it will be co-linearly aligned with the line segment 21, as indicated by the extended line designated by the numeral 31 in FIG. 2, as the hook 7 is subjected to its maximum design load 29. It is to be understood that the load 29 may comprise a single inline stress, or a combination of a plurality of force components.

Upon removal of the load 29 the hook 7 will re-flex, such that the dot 23 will return to co-linear alignment with the line segment 21 along the extended line 25, as shown in FIG. 1. If the load 29 is less than the maximum design load of the hook 7, a line extended from the line segment 21 will be spaced intermediate to the dots 23 and 27.

Figure 3:
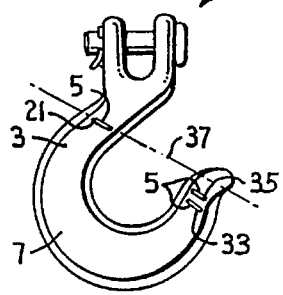
FIG. 3 is a side elevational view of the hoisting hook, shown in a deformed, damaged state.

FIG. 3 shows a slightly different arrangement wherein the dot 23 is replaced by a line segment 33, and the dot 27 is replaced by a line segment 35. It is to be understood that, if desired, a dot may be used in conjunction with the line segment 33 and/or the line segment 35 instead of the line segment 21, as herein described.

An advantage of using the line segment 21 with the line segments 33 and 35, as opposed to the dots 23 and 27, arises in the event that one of the corresponding line segments 21 and 33, or 21 and 35 becomes damaged from usage such that its location is known but its orientation is not readily discernable. Then, stressing can be determined by evaluating the colinearity of the damaged line segment 21, 33 or 35 with the corresponding undamaged line segment 21, 33 or 35, as herein described.

The hook 7, as shown in FIG. 3, is shown in an unstressed (no load) condition. However, an extended line co-linear with the line segment 21, as designated by the numeral 37, is not aligned with the line segment 33. Thus, the indicia 5 indicates in that case that the hook 7 has been overstressed. Therefore, the maximum stress which can be safely handled subsequently by the hook 7 may be substantially reduced from the original maximum design load of the hook 7. As a result, the indicia 5 indicates that the hook 7 should be removed from service.

In FIG. 1, the extended line 25 is shown askew relative to the connecting member 17. It is to be understood that the components 21 and 23, for example, of the indicia 5 can have any desired orientation. Preferably, the indicia 5 will be arranged such that deviations of the components 21 and 23 from their unstressed configuration is sensitive and responsive to stressing of the hook 7.

Figure 4:
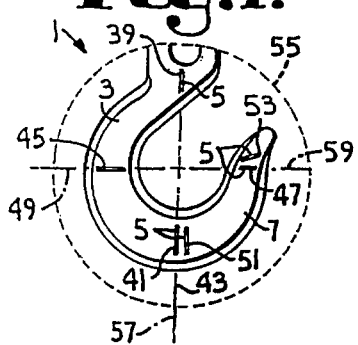
FIG. 4 is a side elevational and fragmentary view of the hoisting hook, shown being viewed through an instrument having cross hairs.

Another configuration for the indicia 5 of the present invention 1 is shown in FIG. 4, where the indicia 5 of the hook 7 comprises a pair of corresponding components 39 and 41, which are spaced co-linearly along an extended line designated by the numeral 43 in FIG. 4, and another pair of corresponding components 45 and 47, which are spaced colinearly along another extended line designated by the numeral 49 in FIG. 4, wherein the extended line 49 is perpendicular to the extended line 43 as the hook 7 is in an unstressed and undeformed state.

If desired, the indicia 5 may also include corresponding components 51 and/or 53 for operably indicating stressing of the hook 7 relative to the maximum design stress of the hook 7. Of course, spacings of the extended line 43 intermediate to the components 41 and 51 and/or spacings of the extended line 49 intermediate to the components 47 and 53 would indicate that the stressing of the hook 7, if not previously damaged from overstressing, is less than the maximum design stress of the hook 7.

It is to be understood that one component of each of the pairs 39 and 41, 39 and 51, 45 and 47, and 45 and 53 may comprise a dot, as opposed to a line segment as shown in FIG. 4.

Some applications of the present invention, for one reason or another, may not permit a user to be physically alongside the device 1 to utilize the advantages provided by the indicia 5. Such applications may involve handling of hazardous materials, hoisting over water, or spacing at substantial heights above the ground, etc. The indicia 5 of the present invention permits a user to remotely make stressing and overstressing determinations, such as by viewing the hook 7 through a transit, as shown in phantom and designated by the numeral 55 in FIG. 4, or similar telescopic instrument having crosshairs 57 and 59, or other suitable arrangement.

For purposes of illustration, the crosshair 57 may be superimposed over the line segment 39 and the crosshair 59 may be superimposed over the line segment 45 for operably and remotely making the understressing or overstressed determinations of the hook 7 as herein described.

As another example, the indicia 5 of the shackle 9 may include a corresponding pair of oppositely spaced line segments 61 and 63, as shown in FIG. 5, similar to those hereinbefore described for the hook 7. As the shackle 9 is in an unstressed and undeformed state, the line segments 61 and 63 will lie co-linearly along an extended line, designated by the numeral 65 in FIG. 5. After each use, if the shackle 9 has not been damaged by overstressing, the line segments 61 and 63 will return to their unstressed alignment.

If, however, the shackle 9 has been damaged from overstressing, the line segments 61 and 63 will not return to their unstressed alignment. For example, if the shackle 9 has become deformed from excessive lengthwise stressing such that the shackle 9 has become permanently elongated, the line segments 61 and 63 will be mis-aligned as the shackle is in an unstressed state, as indicated by the non-aligned extended lines 67 and 69 in FIG. 6. As another example, if the shackle 9 has become deformed from excessive crosswise stressing, the line segments will be mis-aligned as the shackle 9 is in an unstressed state, as indicated by the non-aligned extended lines 71 and 73 in FIG. 7.

As another example of the device 1 according to the present invention, the indicia 5 of the ring 11 may include a corresponding pair of oppositely spaced components, similar to those hereinbefore described for the hook 7 or shackle 9, or may include a plurality of corresponding pairs of oppositely spaced components, such as pairs 75, 77, 79 and 81 as shown in FIG. 8. As the ring 11 is in an unstressed and undeformed state, each of the pairs 75, 77, 79 and 81 respectively co-linearly align, as indicated by the extended line designated by the numeral 83 in FIG. 8, for the pair 75.

After each use, if the ring 11 has not been damaged by overstressing, each of the pairs 75, 77, 79 and 81 will return to their respective, unstressed alignment. If, however, the ring 11 has been damaged from overstressing, some of the pairs of oppositely spaced components, such as the pairs 77 and 81, will return to their respective, unstressed alignments. Others of the pairs, however, such as the pairs 75 and 79, will not return to their respective, unstressed alignments, as indicated by extended lines designated by the numerals 85 and 87 in FIG. 9, for the pair 75.

As a further example, the indicia 5 of the link 13 may include a corresponding pair of oppositely spaced components, similar to those hereinbefore described for the hook 7 or the shackle 9, or may include a plurality of corresponding pairs of oppositely spaced components, such as pairs 89 and 91 as shown in FIG. 10, similar to those hereinbefore described for the ring 11. As the link 13 is in an unstressed and undeformed state, each of the pairs 89 and 91 respectively co-linearly align, as indicated by the extended line designated by the numeral 93 in FIG. 10, for the pair 89.

After each use, if the link 13 has not been damaged by overstressing, each of the pairs 89 and 91 will return to their respective, unstressed alignment. If, however, the link 13 has been damaged from overstressing, the pairs 89 and 91, will not return to their respective, unstressed alignments, as indicated by extended lines designated by the numerals 95 and 97 for the pair 89, and by extended lines designated by the numerals 98 and 99 in FIG. 11 for the pair 91.

It is foreseen that the indicia on hoisting devices may have a variety of geometrical configurations other than those described herein, including a circularly shaped arc with a fixed radius. Comparison of the latter with an originally congruent template (not shown) enables a user to determine whether the device has been damaged from overstressing.

It is to be understood that while certain forms of the present invention have been illustrated and described herein, it is not to be limited to the specific forms or arrangement of parts described and shown.

What is claimed and desired to be secured by Letters Patent is as follows:

1. A device for binding or hoisting loads with a connecting member, said device comprising:
   a) a body having structure for operably connecting said body to the connecting member; and
   b) indicia affixed to said body, said indicia comprising first components that are not colinearly aligned as said device is in an undeformed and unstressed state and that are colinearly aligned when a portion of said body of said device is partially deflected but not deformed.

2. The device according to claim 1, wherein said device is a hook.

3. The device according to claim 1, wherein said device is a shackle.

4. The device according to claim 1, wherein said device is a ring.

5. The device according to claim 1, wherein said device is a link.

6. The device according to claim 1, wherein said indicia protrudes from said body.

7. The device according to claim 1, wherein said indicia is engraved in said body.

8. The device according to claim 1, wherein said indicia further comprise second components that are colinearly aligned as said device is in said undeformed state.

9. The device according to claim 1, wherein at least one of said first components comprises a line segment.

10. The device according to claim 1, wherein one of said first components comprises a dot.

11. The device according to claim 1, wherein said first components comprise a pair of corresponding line segments.

12. The device according to claim 1, wherein said first components comprise a line segment and a corresponding dot.

13. The device according to claim 1, wherein said indicia further comprise cooperating second components that are colinearly aligned as said device is subjected to its maximum design stress.

14. The device according to claim 13, wherein at least one of said second components comprises a line segment.

15. The device according to claim 13, wherein one of said second components comprises a dot.

16. The device according to claim 13, wherein said second components comprise a pair of corresponding line segments.

17. The device according to claim 13, wherein said second components comprise a line segment and a corresponding dot.

18. The device according to claim 1, wherein said indicia further includes second components that are aligned as said device is in an undeformed and unstressed state and that are not aligned as said device is in a deflected state.

19. The device according to claim 18 wherein said first components and said second components each comprise at least one line segment.

20. The device according to claim 18 wherein said first components and said second components each comprise a pair of cooperating line segments.

21. A device for hoisting a load with a connecting member, said device comprising:

a) a body having structure for connecting to the connecting member, said body having a hook-shaped configuration; and b) indicia affixed to said body, said indicia including a first set of components, at least one of which is a line segment, that are colinearly aligned as said device is in an undeformed and unstressed state and that are not colinearly aligned as said device is in a deflected state; said indicia further including a second set of components, at least one of which is a line segment, that are not colinearly aligned as said device is in an undeformed and unstressed state and that are colinearly aligned as said device is in an undeformed state and is subjected to its maximum design stress; and (c) wherein the presence of said colinear and non-colinear alignments of said first and second sets of components are ascertainable by comparing respective said first and second sets of components with a straightedge.

22. The device according to claim 21, wherein said colinear and non-colinear alignments of said first and second sets of components are remotely observable.

* * * * *